United States Patent [19]
Kunzi et al.

[11] Patent Number: 5,447,198
[45] Date of Patent: Sep. 5, 1995

[54] LOW TEMPERATURE WELL CEMENTING COMPOSITIONS AND METHODS

[75] Inventors: Robert A. Kunzi, Bakersfield, Calif.; Edward F. Vinson, Duncan, Okla.; Patty L. Totten, Duncan, Okla.; Bobby G. Brake, Duncan, Okla.

[73] Assignee: Halliburton Company, Duncan, Okla.

[21] Appl. No.: 258,155

[22] Filed: Jun. 10, 1994

Related U.S. Application Data

[60] Division of Ser. No. 112,826, Aug. 26, 1993, Pat. No. 5,346,550, which is a continuation-in-part of Ser. No. 832,209, Feb. 5, 1992, abandoned.

[51] Int. Cl.$^6$ ............... C04B 14/04; E21B 33/138
[52] U.S. Cl. .................... 166/293; 106/708; 106/709; 106/724; 106/725; 106/802; 106/819; 106/823; 106/DIG. 1; 166/292
[58] Field of Search ............... 166/293, 292, 901; 106/708, 709, 724, 735, 802, 819, 823, DIG. 1

[56] References Cited

U.S. PATENT DOCUMENTS

| | | | |
|---|---|---|---|
| 3,179,528 | 4/1965 | Holmgren et al. | 166/293 X |
| 3,891,454 | 6/1975 | Cunningham et al. | |
| 3,937,282 | 2/1976 | Shryock et al. | 166/293 |
| 4,054,461 | 10/1977 | Martin | 166/293 X |
| 4,176,720 | 12/1979 | Wilson | 166/293 |
| 4,557,763 | 12/1985 | George et al. | 166/293 |
| 4,703,801 | 11/1987 | Fry et al. | 166/293 |
| 5,116,421 | 5/1992 | Ganguli | 106/293 |

OTHER PUBLICATIONS

"Well Cementing" Edited by Erik B. Nelson, pp. 7-5, 7-6, 7-12 and 7-13, published by Elsevier, New York City, N.Y. (Date Unknown).

*Journal of Canadian Petroleum Technology*, Oct.-Dec. 1972, Montreal, Canada, article entitled "Arctic Cements and Cementing".

*Hawley's Condensed Chemical Dictionary*, Eleventh Edition, 1987, Van Nostrand Reinhold Company, p. 487.

"Design and Control of Concrete Mixtures" by Steven H. Kosmatka and William C. Panarese, 1988.

*Primary Examiner*—George A. Suchfield
*Attorney, Agent, or Firm*—Robert A. Kent

[57] ABSTRACT

Improved hydraulic cement compositions and methods for cementing wells drilled through low temperature earth formations wherein the cement is subjected to freeze-thaw cycling are provided. The compositions are comprised of a hydraulic cement, gypsum cement, fly ash, an alkali metal halide, water, and an alcohol freezing point depressant.

7 Claims, No Drawings

LOW TEMPERATURE WELL CEMENTING COMPOSITIONS AND METHODS

This application is a division of prior copending application Ser. No. 08/112,826 filed Aug. 26, 1993, now U.S. Pat. No. 5,346,550 which is a continuation-in-part of prior copending application Ser. No. 07/832,209 filed Feb. 5, 1992, now abandoned.

BACKGROUND OF THE INVENTION

1. Field of the Invention.

The present invention relates generally to low temperature well cementing compositions, and more particularly, to hydraulic cement compositions which have improved resistance to deterioration as a result of freeze-thaw cycling and methods of cementing therewith.

2. Description of the Prior Art.

A variety of hydraulic cement compositions have been developed for performing cementing operations in subterranean earth formations penetrated by a wellbore. For example, hydraulic cement compositions are commonly used in primary cementing operations in oil and gas wells whereby pipe, such as casing and liners, are cemented in well bores. In the usual primary cementing operation, a hydraulic cement composition is introduced into a well bore by way of the pipe to be cemented therein and displaced into the annular space between the pipe and the surrounding formation. The cement composition is allowed to set into a solid mass or sheath, whereby the annular space is sealed and the pipe is bonded to the formation. In other cementing operations, i.e., secondary cementing or remedial operations, a hydraulic cement composition is placed in cracks or voids in the sheath or formation and allowed to set therein so that fluid tight seals result.

When primary and secondary cementing operations are performed in low temperature earth formations, i.e., formations which are frozen or periodically subjected to freezing, various problems are encountered. For example, when conventional hydraulic cement compositions are placed in low temperature subterranean formations, long periods of set time are required to enable the compositions to develop sufficient compressive strengths to permit resumption of drilling or completion operations. In addition, conventional cement compositions exhibit high heats of hydration which can cause surrounding frozen formations to melt to thereby prevent proper bonding of the cement compositions to the formations as well as promoting destabilization of the formation. Furthermore, conventional cement compositions utilized in frozen formations have also frozen prior to setting to thereby prevent setting and/or the development of sufficient compressive strengths. In addition to the above, prior cement compositions have failed due to deterioration in compressive strength of set cements caused by exposure of the set cement to freeze-thaw cycling. Freeze-thaw cycling is the expression used to refer to cyclic variations in temperature about and below the freezing point of water.

Special hydraulic cement compositions and methods for carrying out well cementing operations at low temperatures have been developed and utilized heretofore. For example, related U.S. Pat. Nos. 3,891,454 and 3,937,282 issued on Jun. 24, 1975 and Feb. 10, 1976, respectively, disclose cement compositions and methods for carrying out well cementing operations in low temperature earth formations. While such cement compositions and methods have been used successfully, problems have still been encountered in wells in which freeze-thaw cycling occurs. That is, the special low temperature cement compositions have low freezing points, rapidly set and develop strength at low temperatures, and have low heats of hydration. However, when the set cement compositions are subjected to freeze-thaw cycling, relatively rapid cracking and crumbling of the cement takes place whereby the cement loses its compressive strength as well as its bonding and sealing ability.

Thus, there is a need for improved hydraulic cement compositions and methods for cementing wells drilled through low temperature earth formations whereby the set cement has resistance to deterioration as a result of freeze-thaw cycling.

SUMMARY OF THE INVENTION

By the present invention, improved hydraulic cement compositions and methods for cementing wells drilled through low temperature earth formations are provided which overcome the shortcomings of the prior art and meet the need described above. The improved cement composition consists essentially of a hydraulic cement present in the composition in an amount in the range of from about 5 pounds to about 30 pounds per 75 pound sack of solids, gypsum cement present in the composition in an amount in the range of from about 25 pounds to about 50 pounds per 75 pound sack of solids, fly ash present in the composition in an amount in the range of from about 5 pounds to about 30 pounds per 75 pound sack of solids, an alkali metal chloride present in the composition in an amount in the range of from about 1 pound to about 18 pounds per 75 pound sack of solids, water present in the composition in an amount in the range of from about 2 gallons to about 12 gallons per 75 pound sack of solids and an alcohol freezing point depressant present in the composition in an amount in the range of from about 1% to about 18% by weight of the water in the composition.

A preferred such alcohol freezing point depressant is ethylene glycol.

The methods of the invention generally comprise depositing the improved hydraulic cement composition of this invention in a low temperature formation and allowing the cement composition to set into a hard mass therein.

It is, therefore, a general object of the present invention to provide improved low temperature well cementing compositions and methods.

A further object of the present invention is to provide improved hydraulic cement compositions which set before freezing, rapidly develop compressive strength, have low heats of hydration and which upon setting withstand freeze-thaw cycling without rapid deterioration and loss of compressive strength.

Other and further objects, features and advantages of the present invention will be readily apparent to those skilled in the art upon a reading of the description of preferred embodiments which follows.

DESCRIPTION OF PREFERRED EMBODIMENTS

The present invention provides improved hydraulic cement compositions and methods for cementing wells drilled through low temperature earth formations. The term "low temperature" as used herein means temperatures which fall within the range of from below the freezing point of water to above the freezing point of water. The term in the context of this invention applies to the temperature of the down hole environment to which a cement composition of this invention is exposed when deposited and in which it must set, and develop and maintain compressive strength.

Set cement is exposed to the temperature of the earth through which a well bore is drilled as well as the temperature of the various fluids flowing into and out of the well bore in contact with the pipe cemented therein. For example, the surface soil and an upper part of the earth formation adjacent thereto may be permanently frozen, but the fluids flowing through the well bore either during drilling or during production of formation fluids may periodically be well above freezing; the set cement in the well bore is therefore subjected to cyclic changes from temperatures below freezing to temperatures well above freezing, a condition referred to herein as freeze-thaw cycling. In another circumstance, the well bore may be drilled in a location where a portion of the earth through which the well bore extends is frozen during the winter months, but not frozen during the summer months thereby subjecting a portion of the set cement in the well bore to freeze-thaw cycling.

When a cement composition of the prior art is subjected to freeze-thaw cycling, cracks and crumbling take place in the set cement whereby the set cement loses its compressive strength and integrity. The cracks and crumbling result from the cyclic freezing and thawing of free mix water trapped within the capillary pores of the set cement as well as water which penetrates the set cement from the surroundings by way of the permeability of the set cement.

It has been the custom of those skilled in the art of well cementing to express the concentration of the solid components of a hydraulic cement composition used for well cementing in terms of parts by weight of a sack of solids. Each sack of solids, which comprises all of the solid components of the cement composition, weighs 75 pounds. The word "sack" as used herein, accordingly, means a 75 pound sack of solids.

The improved hydraulic cement composition of this invention consists essentially of a hydraulic cement, gypsum cement, i.e., calcium sulfate hemihydrate, fly ash, an alkali metal chloride, water and an alcohol freezing point depressant. The compositions of this invention do not freeze before setting at low temperatures, provide high strengths in short curing times, have low heats of hydration, whereby adjacent frozen formations are not melted and destabilized, and, in addition, provide high resistance to deterioration as a result of freeze-thaw cycling.

A variety of commercially available hydraulic cements can be utilized in accordance with this invention, but the Portland cements identified and defined in *API Specification for Materials and Testing for Well Cements*, API Spec 10, of the American Petroleum Institute, which is incorporated herein by reference, are preferred. Of those, a Portland cement selected from API classes A, B, C, G and H are more preferred with API class G Portland cement being the most preferred.

High alumina cements, i.e., cements having alumina concentrations in the range of from about 15% to about 40% by weight, are generally unsuitable for use in that they have high heats of hydration. As mentioned above, the high heats of hydration liberated while such high alumina cements cure can melt the ice which holds frozen formations together thereby preventing bonding.

The hydraulic cement utilized is present in the cement composition of this invention in an amount in the range of from about 5 pounds to about 30 pounds per 75 pound sack of solids. Concentrations of cement below about 5 pounds per sack do not generally provide enough compressive strength as the cement composition cures and concentrations of cement above about 30 pounds per sack do not produce early compressive strengths due to the low curing temperature. The preferred amount of hydraulic cement in the cement composition is an amount in the range of from about 10 pounds to about 25 pounds per sack with the most preferred amount of cement being in the range of from about 12 pounds to about 20 pounds per sack.

Any commercially available gypsum cement, i.e., calcium sulfate hemihydrate ($CaSO_4 \cdot \frac{1}{2} H_2O$), can be utilized in accordance with the present invention. Particulate gypsum cement having a particle size such that about 75% to about 90% passes through a 100 mesh Tyler screen is preferred. The purpose of the gypsum cement is to enhance the development of high early strength by the cement composition while it is curing. As the cement composition cures, the hydraulic cement provides strength, but during the first few hours after the composition has been deposited in a low temperature subterranean formation the strength is primarily provided by the gypsum cement. High early compressive strength is important because it is generally desirable to resume drilling, completion or production operations as soon as possible after the cement composition has been placed.

The gypsum cement should be present in the cement composition of this invention in an amount in the range of from about 25 pounds to about 50 pounds per sack. A more preferred amount of gypsum cement is in the range of from about 30 pounds to about 45 pounds per sack with from about 35 pounds to about 41 pounds per sack being the most preferred.

Fly ash useful herein is separated from combustion gases produced in power plants which burn pulverized coal. The ash is very finely divided with a surface area roughly equivalent to that of Portland cements. Fly ash is principally composed of silica, alumina and iron oxide although a variety of other materials are also found in fly ash. The composition and properties of fly ash vary widely depending upon the source of the coal, the efficiency of the power plant and other factors. The American Society for Testing and Materials (ASTM) has recognized three classes of fly ash; namely, classes N, F and C. Of these, classes F and C are suitable for use in accordance with the present invention with type F being the most preferred. Class F fly ash is normally produced from burning anthracite or bituminous coals while class C fly ash is produced from lignite or subbituminous coals.

Fly ash performs two functions in the cement composition of this invention wherein one is to reduce the long term permeability of the cured cement and the second is to reduce the overall heat of hydration of the cement composition. Lime released during the hydration of Portland cement reacts with the fly ash to form hydrates within the capillary pores of the set cement to thereby eliminate potentially leachable free lime. Fly ash thus acts to reduce the permeability of the set cement. The reaction between fly ash and lime typically occurs slowly and requires a relatively long curing time. The reduction in permeability of the set cement prevents, or at least drastically reduces, the intrusion of water thereinto rendering the cement much less susceptible to deterioration as a result of freeze-thaw cycling.

Gypsum cement, although producing high early strength, does generate a heat of hydration higher than that generated by Portland cement. Fly ash, on the other hand, generates a heat of hydration lower than that generated by either Portland cement or gypsum cement. The reduction of the heat of hydration prevents melting of the surrounding frozen formations thus preventing destabilization of the wellbore and proper bonding of the compositions to the formation.

Fly ash is included in the cement composition in an amount in the range of from about 5 pounds to about 30 pounds per sack. A more preferred amount of fly ash is in the range of from about 10 pounds to about 25 pounds per sack with the most preferred range being in the range of from about 12 pounds to about 17 pounds per sack.

The temperature at the surface during slurry preparation is often times at or below the freezing point of water. An alkali metal halide, preferably an alkali metal chloride, is included in the cement composition to prevent the mix water used to prepare the slurry from freezing during surface mixing operations. Mix water, prior to mixing with the dry blended cement components, is often preheated, however, since the dry blended components are stored in containers or tanks outdoors at temperatures near or below freezing, and can, even when added to the heated water, rapidly drop the temperature of the slurry to near freezing or below freezing temperatures, the alkali metal chloride functions to prevent freezing of the slurry during the mixing operations. The alkali metal chloride also prevents freezing during and after placement across formations prior to when the cement sets and hardens. Sodium chloride is the most preferred alkali metal chloride. Generally, the freezing point depressing salt is included in the cement composition in an amount in the range of from about 1 pound to about 18 pounds per sack. A more preferred amount is in the range of from about 2 pounds to about 10 pounds per sack with an amount in the range of from about 3 pounds to about 5 pounds per sack being the most preferred.

Fresh water is preferably utilized for forming the cement composition of this invention. The quantity of water used is relatively low so that only that amount of water required for hydration of the hydraulic cement and gypsum cement plus the minimum additional amount required to produce a pumpable slurry of the desired density is present. Generally, water is included in the composition in an amount in the range of from about 2 gallons to about 12 gallons per sack. A more preferred amount of water is in the range of from about 2.5 gallons to about 9.5 gallons per sack with the most preferred range being from about 2.8 gallons to about 9.2 gallons per sack.

As indicated above, the amount of mix water included in the cement composition of this invention is in excess of the amount required for the hydration reaction with the hydraulic cement, fly ash, and gypsum cements. Excess water can also be imbibed. In either case, some excess water and the slow rate and long cure time required for the lime-fly ash reaction, assures that some quantity of water remains in capillary pores within the hardened cement. The capillary pores form an interconnected system distributed randomly within the set cement. The presence of the interconnected capillary pores are responsible for permeability of the hardened cement. Subsequent thawing and refreezing cycles produce expansion and contraction, the cumulative effect of which tends to destroy the hardened cement.

A portion of the alkali metal halide freezing point depressant does become chemically associated within the solid lattice of the set cement during hydration. Therefore, a secondary freezing point depressant to prevent freezing of the above described excess water in the pores of the set cement is employed in the composition of this invention to prevent the long term deterioration of repeated freezing and thawing cycles. The secondary freezing point depressant is preferably an alcohol such as ethylene glycol, propylene glycol and diethylene glycol, wherein, ethylene glycol is the most preferred. The amount of alcohol freezing point depressant included in the composition can vary depending upon the particular alcohol utilized and other factors. Generally, the alcohol is added to the cement composition in an amount in the range of from about 1% to about 18% by weight of water in the composition. When ethylene glycol is utilized, it is preferably included in the cement composition in an amount in the range of from about 2% to about 7% by weight of the water included therein.

The cement composition of this invention also preferably includes a dispersing agent and a fluid loss control additive. The dispersing agent functions to facilitate the dispersal of the solids in the water, and allows the use of smaller amounts of water than is the case without the dispersing agent. While a variety of dispersing agents known to those skilled in the art can be utilized, a dispersing agent selected from sodium salts of naphthalene sulfonic acid condensed with formaldehyde and mixtures thereof with polyvinylpyrrolidone are particularly suitable and preferred. Another preferred dispersing agent is a water soluble polymer prepared by the caustic catalyzed condensation of formaldehyde with acetone wherein the polymer contains sodium sulfite groups. A dispersing agent of the former type, i.e., a mixture of polyvinylpyrrolidone and a sodium salt of naphthalene sulfonic acid condensed with formaldehyde, is commercially available under the trade designation "CFR-2" TM dispersing agent from Halliburton Energy Services of Duncan, Okla. A dispersing agent of the latter type, i.e., a polymer prepared by the caustic catalyzed condensation of formaldehyde with acetone is commercially available under the trade designation "CFR-3" TM dispersing agent from Halliburton Energy Services. The dispersing agent is generally included in the cement composition of this invention in an amount up to about 1 pound per sack, more preferably in an amount in the range of from about 0.1 pound to about 0.35 pound per sack.

Various fluid loss control additives can also be utilized in the cement composition of this invention. A preferred fluid loss control agent is selected from the group consisting of hydrolyzed copolymers of N,N-dimethylacrylamide and 2-acrylamido, 2-methyl propane sulfonic acid. Such a fluid loss control agent is commercially available under the trade designation "HALAD-344" TM fluid loss control agency from Halliburton Energy Services. The fluid loss control additive is generally included in the composition of this invention in an amount up to about 2 pounds per sack, more preferably in an amount in the range of from about 0.1 pound to about 1 pound.

As is well understood by those skilled in the art, a variety of other components and additives can be included in the cement composition of this invention. For example, fillers or extenders such as gilsonite, diatomaceous earth, ground coal, sand and the like can be included. Such fillers increase the volume of the cement composition and also function to some degree as fluid loss control agents.

Another additive which can be included is a set time retarding agent such as citric acid or the alkaline earth metal salts of citric acid. The retarding agent is included in the cement composition in an amount in the range of from about 0.01 pound to about 0.5 pound per sack. Generally, however, it is desirable that the cement compositions set as soon as possible after placement, and the use of a setting time retarding agent is often not required.

The hydraulic cement composition of this invention can be prepared by mixing the dry solids together in any order. The dry solids mixture can be transported to the job site in sacks or as a bulk blend in conventional bulk handling equipment. The liquid component, such as ethylene glycol, and the dry solids can be added to water at the job site; the liquids and solids mixtures can be combined utilizing conventional well site cement composition mixing apparatus.

In accordance with the methods of this invention for conducting cementing operations in a low temperature formation penetrated by a well bore, the hydraulic cement composition of the invention is first deposited in a subterranean formation by pumping the cement composition thereinto by way of the well bore. Once deposited at the desired location in the subterranean formation, the cement composition is allowed to set into a hard substantially impermeable mass therein.

In order to further illustrate the cement compositions and methods of the present invention, the following examples are given.

EXAMPLE 1A

A cement composition, "A", and a cement composition of the type described in U.S. Pat. No. 3,891,454 were prepared containing the components and amounts given in Table I below.

TABLE I

| Component | Amounts lb/sack or gal/sack | |
|---|---|---|
| | "A" | U.S. Pat. No. 3,891,454 |
| Portland Class G Hydraulic Cement | 20.0 lb | 26.0 lb |
| Gypsum Cement | 35.0 lb | 41.0 lb |
| Class F Fly Ash | 17.0 lb | 0 |
| Filler[1] | 0 | 4.6 lb |
| Sodium Chloride | 3.0 lb | 3.0 lb |
| Dispersing Agent[2] | 0.33 lb | 0.33 lb |
| Citric Acid | 0.13 lb | 0.07 lb |
| Fresh Water | 3.5 gal | 3.5 gal |
| Ethylene glycol | 0 gal | 0 gal |

[1]gilsonite
[2]"CFR-2" dispensing agent commercially available from Halliburton Energy Services, Duncan, Oklahoma Freeze-thaw cycle compressive strength tests were conducted on the cement compositions in accordance with the *Specification for Materials and Testing For Well Cements*, API Spec. 10, Appendix K.5. The results of these tests are given in Table II below.

TABLE II

| | Compressive Strength, psi | |
|---|---|---|
| Tests | "A" | U.S. Pat. No. 3,891,454 |
| 48 Hr. Compressive Strength at 40° F. | 401 | 402 |
| Compressive Strength after Cycle 1 (14 Days) | 1600 | 745 |
| Compressive Strength after Cycle 3 (42 Days) | 1210 | 600 |

From Table II, it is seen that the inclusion of fly ash in composition "A" dramatically improves the long term compressive strength stability to freeze-thaw cycling by at least two fold.

EXAMPLE 1B

Ethylene glycol was added to each of the cement compositions described in Table I in amounts of 5.1% and 13% by weight of water therein, and the freeze-thaw cycle tests were repeated on the resulting cement compositions. The results of these tests are given in Table III below.

TABLE III

| | Compressive Strength, psi | |
|---|---|---|
| Tests | Present Invention | "B" |
| With 5.1% by Wt. of Ethylene Glycol | | |
| 48 Hr. Compressive Strength at 40° F. | 215 | 275 |
| Compressive Strength after Cycle 1 (14 Days) | 2312 | 1807 |
| Compressive Strength after Cycle 3 (42 Days) | 2600 | 2000 |
| With 13% by Wt. of Ethylene Glycol | | |
| 48 Hr. Compressive Strength at 40° F. | 282 | 305 |
| Compressive Strength after Cycle 1 (14 Days) | 3369 | 2212 |
| Compressive Strength after Cycle 3 (42 Days) | 3650 | 2750 |

From the results set forth in Tables II and III, it is apparent that the composition of this invention including both fly ash and ethylene glycol improves the ability of the cement composition to withstand the long term rigors of freezing and thawing cycling, even though the inclusion of ethylene glycol does appear to lower the very early compressive strength development.

EXAMPLE 1C

Water and air permeabilities were performed on cement compositions, 11AI! , U.S. Pat. No. 3,891,454 (Table II) and the present invention (5.1% ethylene glycol) (Table III).

TABLE IV

| Tests | "A" | U.S. Pat. No. 3,891,454 | Present Invention |
|---|---|---|---|
| Water Permeability | | | |
| After 48 Hrs. Cured at 40° F. | 0.7502 md | 2.1257 md | 0.6877 md |
| Air Permeability | | | |
| After 48 Hrs. Cured at 40° F. | 1.68 md | 1.93 md | 1.68 md |
| After Cycle 3 (42 days) | 0.004407 Km md | Cubes unstable* | 0.001394 Km md |

*Cubes were unstable and could not be cored for permeability tests.
md - millidarcy
Km md - microdarcy

EXAMPLE 2

Freeze-thaw cycle compressive strength tests were conducted on cement compositions prepared as described in Example 1A but without sodium chloride. Composition "C" is Composition "A" absent sodium chloride. Composition "D" is composition U.S. Pat. No. 3,891,454 absent sodium chloride. Ethylene glycol in the amount of 5.1% by weight of water in the compositions was then added, and the freeze-thaw cycle compressive strength tests were repeated. Composition "E" is Composition "C" plus ethylene glycol. Composition "F" is Composition "D" plus ethylene glycol. The results of these tests are given in Table V below.

TABLE V

| Tests | Compressive Strength, psi | | | |
|---|---|---|---|---|
| | "C" | "D" | "E" | "F" |
| | | | With 5.1% by Wt. of Ethylene Glycol | |
| 48 Hr. Compressive Strength at 40° F. | 800 | 780 | 605 | 725 |
| Compressive Strength after Cycle 1 (14 Days) | 2265 | 1280 | 2795 | 850 |
| Compressive Strength after Cycle 3 (42 Days) | 86 | 31 | 500 | 56 |

Comparisons of compressive strength results in Tables II, III, and V show compositions without sodium chloride improved short term compressive strength development, but exhibited poor long term (42 day) freeze-thaw cycling resistance to deterioration. The presence of ethylene glycol and fly ash without sodium chloride does not result in a composition capable of maintaining long term compressive strength. Both freezing point depressants, that is, the alkali metal chloride for short term protection, and ethylene glycol for long term protection, and fly ash for reduction in long term permeability appear necessary to provide a stable low temperature cementing composition.

EXAMPLE 3

Cement compositions of the same density (15.6 lb/gal) with and without fly ash and ethylene glycol and with various quantities of other components were prepared and tested for freeze-thaw cycle compressive strengths. The components and amounts for each composition tested and the results of the tests are given in Table VI below.

TABLE VI

| Component | Amounts, lb/sack or gal/sack Composition No. | | | | | |
|---|---|---|---|---|---|---|
| | 1 | 2 | 3 | 4 | 5 | 6 |
| Portland Class G Hydraulic Cement, lb/sack | 27.65 | 27.65 | 27.65 | 13.59 | 13.59 | 13.59 |
| Gypsum Cement, lb/sack | 43.59 | 43.59 | 43.59 | 43.59 | 43.59 | 43.59 |
| Class F Fly Ash, lb/sack | 0 | 0 | 0 | 14.06 | 14.06 | 14.06 |
| Sodium Chloride, lb/sack | 3.52 | 3.52 | 3.52 | 3.52 | 3.52 | 3.52 |
| Dispersing Agent[1], lb/sack | 0.11 | 0.11 | 0.11 | 0.11 | 0.11 | 0.11 |
| Fresh Water, gal/sack | 3.45 | 3.31 | 3.09 | 3.09 | 2.95 | 2.74 |
| Ethylene Glycol, & by weight of water | 0 | 5.44 | 14.55 | 0 | 6.10 | 16.45 |
| Density, lb/gal | 15.6 | 15.6 | 15.6 | 15.6 | 15.6 | 15.6 |
| Test Results | | | | | | |
| 48 Hr. Compressive Strength at 40° F. | 1118 | 1042 | 668 | 1137 | 1022 | 920 |
| Compressive Strength after Cycle 1 (14 Days) | 1925 | 1812 | 1850 | 3250 | 3100 | 3162 |
| Compressive Strength after Cycle 3 (42 Days) | 1900[2] | 2335[2] | 2512[2] | 2750[2] | 3362[2,2] | 3375[2] |

[1]"CFR-3" dispensing agent commercially available from Halliburton Energy Services, Duncan, Okla.
[2]Cement cubes contained some hairline cracks.

From Table VI it can be seen that the addition of fly ash to a low temperature cement composition dramatically improves the long term compressive strength development and resistance to deterioration from freeze-thaw cycling (compare Composition No. 1 to Composition No. 4). When ethylene glycol is also added to the composition to produce the composition of this invention, further improvement takes place (compare Compositions Nos. 5 and 6 to Composition No. 4).

EXAMPLE 4

Additional low temperature cement compositions having a reduced density from those of Example 3, i.e., a density of 12 lb/gal instead of 15.6 lb/gal, were prepared and tested. Reducing the density obviously increases the water volume within the composition. The compositions included various components and quantities as shown in Table VII below. The results of the tests are also given in Table VII.

TABLE VII

| Component | Amounts, lb/sack or gal/sack Composition No. | | | |
|---|---|---|---|---|
| | 1 | 2 | 3 | 4 |
| Portland Class G Hydraulic Cement, lb/sack | 22.2 | 22.2 | 12.5 | 12.5 |
| Gypsum Cement, lb/sack | 36.2 | 36.2 | 37.5 | 37.5 |
| Class F Fly Ash, lb/sack | 0 | 0 | 13.3 | 13.3 |
| Sodium Chloride, lb/sack | 4.2 | 4.2 | 4.2 | 4.2 |
| Calcium Chloride, lb/sack | 4.6 | 4.6 | 0 | 0 |
| Diatomaceous Earth Filler, lb/sack | 7.5 | 7.5 | 7.5 | 7.5 |
| Set Time Retarder[1], lb/sack | 0.14 | 0.14 | 0 | 0 |
| Fluid Loss Additive[2], lb/sack | 0.33 | 0.33 | 0.33 | 0.33 |
| Water, gal/sack | 8.90 | 8.78 | 8.98 | 8.80 |
| Ethylene Glycol, % by weight of water | 0 | 1.71 | 2.01 | 5.12 |
| Density, lb/gal | 12.0 | 12.0 | 12.0 | 12.0 |
| Test Results | | | | |
| 48 Hr. Compressive Strength at 40° F. | 57 | 55 | 85 | 75 |
| Compressive Strength after Cycle 1 (14 Days) | 194 | 247 | 445 | 496 |
| Compressive Strength after Cycle 3 (42 Days) | 873 | 893 | 402[4] | 410[4] |

[1]A lignosulfonate retarder commercially available under the trade designation "HR-15" TM retarder from Halliburton Energy Services, Duncan, Oklahoma.
[2]"HALAD-334" TM fluid loss control agent commercially available from Halliburton Energy Services, Duncan, Oklahoma.
[3]Cement cubes crumbling at tops and full of hair line cracks.
[4]Cement cubes contained some hair line cracks.

Comparisons of compressive strength results from Tables II, III, and VII show that the increased water volume required to obtain the density reduction reduced the overall compressive strength of the compositions. The excess water volume decreased the short term 48 hr compressive strength development. Compositions 1 and 2 containing sodium chloride and calcium chloride do not resist deterioration from freeze-thaw cycling. However, the composition of this invention Compositions 3 and 4, containing fly ash, sodium chloride, and ethylene glycol, even in the presence of excess water, have greatly improved resistance to deterioration from freeze-thaw cycling.

Thus, the present invention is well adapted to carry out the objects and attain the ends and advantages mentioned as well as those which are inherent therein. While numerous changes may be able to be made by those skilled in the art, such changes are encompassed within the spirit of this invention as defined by the appended claims.

What is claimed is:

1. A method of cementing in a low temperature formation penetrated by a well bore comprising the steps of:

depositing a cement composition in said formation comprised of:

a hydraulic cement present in said composition in an amount in the range of from about 5 pounds to about 30 pounds per sack, gypsum cement present in an amount in the range of from about 25 pounds to about 50 pounds per sack, fly ash present in an amount in the range of from about 5 pounds to about 30 pounds per sack, an alkali metal halide present in an amount in the range of from about 1 pound to about 18 pounds per sack, water present in an amount in the range of from about 2 gallons to about 12 gallons per sack and an alcohol freezing point depressant present in said composition in an amount in the range of from about 1% to about 18% by weight of the water in said composition; and allowing said cement composition to set in said formation.

2. The method of claim 1 wherein said hydraulic cement is selected from the group consisting of API classes A, B, C, G and H Portland cement.

3. The method of claim 1 wherein said fly ash is selected from the group consisting of ASTM classes F and C fly ash.

4. The method of claim 1 wherein said alkali metal chloride salt is sodium chloride.

5. The method of claim 4 wherein said alcohol freezing point depressant is ethylene glycol.

6. The method of claim 1 wherein said composition further includes a dispersing agent selected from the group consisting of sodium salts of naphthalene sulfonic acid condensed with formaldehyde and mixtures thereof with polyvinylpyrrolidone, and water soluble polymers prepared by the caustic catalyzed condensation of formaldehyde with acetone wherein said polymer contains sodium sulfite groups, said dispersing agent being present in said composition in an amount up to about 1 pound per sack.

7. The method of claim 1 wherein said composition further includes a fluid loss control additive selected from the group consisting of hydrolyzed copolymers of N,N-dimethylacrylamide and 2-acrylamido, 2-methyl propane sulfonic acid present in said composition in an amount up to about 2 pounds per sack.

* * * * *